US009878928B1

(12) United States Patent
 Muirhead

(10) Patent No.: US 9,878,928 B1
(45) Date of Patent: Jan. 30, 2018

(54) PRETREATMENT SOLUTION FOR WATER RECOVERY SYSTEMS

(71) Applicant: The United States of America as represented by the Administrator of the National Aeronautics and Space Administration, Washington, DC (US)

(72) Inventor: Dean Muirhead, Seabrook, TX (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 774 days.

(21) Appl. No.: 14/185,028

(22) Filed: Feb. 20, 2014

Related U.S. Application Data

(60) Provisional application No. 61/775,863, filed on Mar. 11, 2013.

(51) Int. Cl.
 *C02F 1/50* (2006.01)
 *C02F 1/04* (2006.01)
 *C02F 1/66* (2006.01)
 *C02F 1/72* (2006.01)

(52) U.S. Cl.
 CPC .............. *C02F 1/50* (2013.01); *C02F 1/043* (2013.01); *C02F 1/66* (2013.01); *C02F 1/72* (2013.01)

(58) Field of Classification Search
 CPC ....................................................... C02F 1/50
 See application file for complete search history.

(56) References Cited

U.S. PATENT DOCUMENTS

| 3,389,059 A | 6/1968 | Goeldner |
| 5,976,372 A | 11/1999 | Vesterager |
| 6,027,543 A * | 2/2000 | Yoshizaki ............. C02F 11/004 210/724 |
| 6,849,184 B1 * | 2/2005 | Lampi .................. B01D 61/002 210/321.72 |

OTHER PUBLICATIONS

Carter et al., Status of ISS Water Management and Recovery Jul. 2012, 42nd International Conference on Environmental Systems.*
Carter et al., Status of ISS Water Management and Recovery Jul. 2011, 41$^{st}$ International Conference on Environmental Systems.*

* cited by examiner

*Primary Examiner* — Peter Keyworth
(74) *Attorney, Agent, or Firm* — Kurt G. Hammerle; Edward K. Fein; Mark P. Dvorscak

(57) ABSTRACT

Chemical pretreatments are used to produce usable water by treating a water source with a chemical pretreatment that contains a hexavalent chromium and an acid to generate a treated water source, wherein the concentration of sulfate compounds in the acid is negligible, and wherein the treated water source remains substantially free of precipitates after the addition of the chemical pretreatment. Other methods include reducing the pH in urine to be distilled for potable water extraction by pretreating the urine before distillation with a pretreatment solution comprising one or more acid sources selected from a group consisting of phosphoric acid, hydrochloric acid, and nitric acid, wherein the urine remains substantially precipitate free after the addition of the pretreatment solution. Another method described comprises a process for reducing precipitation in urine to be processed for water extraction by mixing the urine with a pretreatment solution comprising hexavalent chromium compound and phosphoric acid.

19 Claims, 3 Drawing Sheets

PRETREATMENT SOLUTION FOR WATER RECOVERY SYSTEMS

CROSS REFERENCE TO RELATED APPLICATIONS

This application claims benefit under 35 U.S.C. § 119(e) of U.S. Provisional Patent Application No. 61/775,863, filed on Mar. 11, 2013 and entitled "Pretreatment System for Water Recovery Systems," which is hereby incorporated by reference.

ORIGIN OF THE DISCLOSURE

The disclosure described herein was made in the performance of work under a NASA contract and is subject to the provisions of Section 305 of the National Aeronautics and Space Act of 1958, Public Law 85-568, now codified at 51 U.S.C. § 20135.

BACKGROUND

In environments having limited water resources or water sources that have been contaminated by minerals or microorganisms, the development and commercialization of systems and methods to regenerate potable water from available resources is paramount. To this end, a number of chemical and physical purification techniques have been developed to overcome these issues.

Physical filtration methods and chemical distillation have been used to generate water products that range from potable water for drinking to grey water for use in agriculture, sanitation, and the like. In certain enclosed environments, such as spacecraft, space stations, and biospheres, it is often desirable to provide potable water by recycling waste waters including high salinity brines and urine.

For example, in a manned spacecraft, water recovery from urine allows astronauts to subsist on a relatively reduced water reservoir supply, which can substantially decrease the costs associated with transporting water supplies and increases self-sustainability in cases where resupply may not be instantly available. However, current methods for recovering potable water from urine and brine are still limited on the amount of water that may be recovered, and limits on the efficiency of water recovery remain.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, methods described herein are directed to methods of extracting potable water that include treating a water source with a chemical pretreatment containing a hexavalent chromium and an acid to generate a treated water source, wherein the concentration of sulfate compounds in the acid is negligible, and wherein treated water source remains substantially free of precipitates after the addition of the chemical pretreatment.

In yet another aspect, methods described herein are directed to methods of reducing the pH in urine to be distilled for potable water extraction that include pretreating the urine before distillation with a pretreatment solution comprising one or more acid sources selected from a group consisting of phosphoric acid, hydrochloric acid, and nitric acid, wherein the urine remains substantially precipitate free after the addition of the pretreatment solution.

Other aspects and advantages of the disclosure will be apparent from the following description and the appended claims.

DETAILED DESCRIPTION

Figure 1:
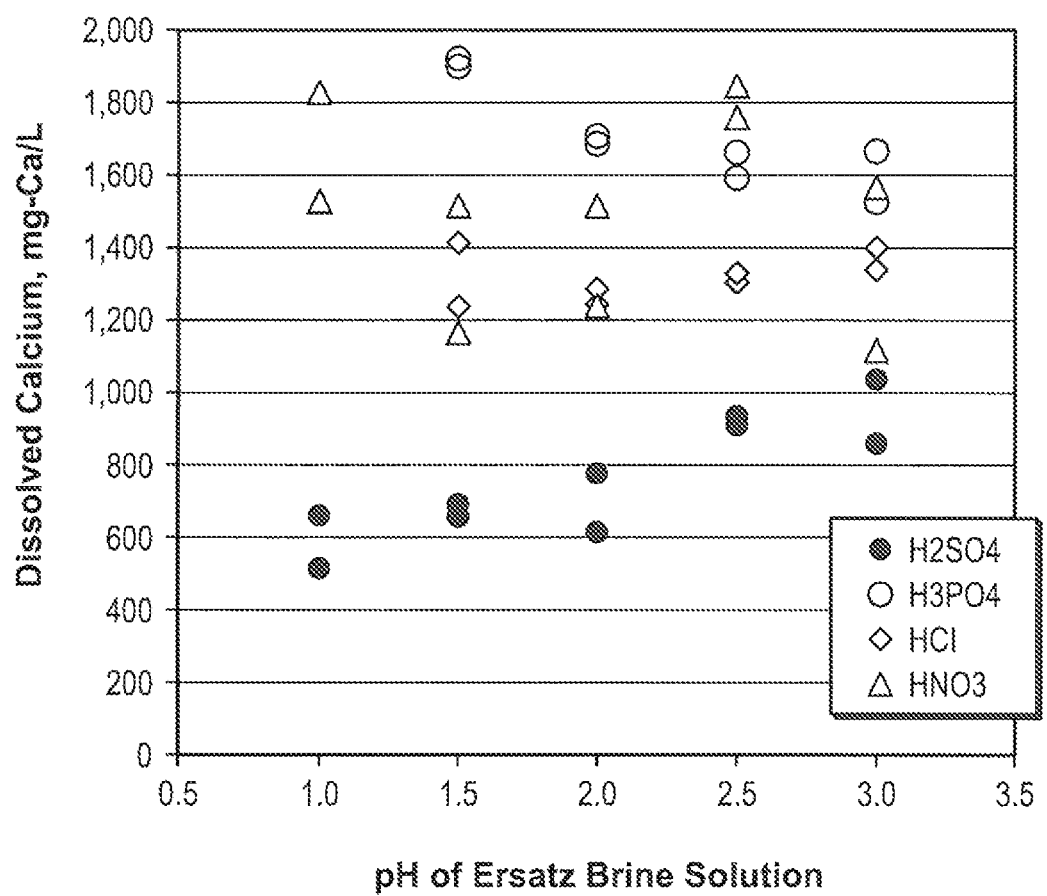
FIG. 1 is an illustration of the improved solubility of calcium sulfate in brines containing chemical pretreatments in accordance with embodiments of the present disclosure.

Embodiments disclosed herein relate to chemical pretreatments for contaminated water sources, including brines, seawater, brackish water, urine, and other forms of wastewater, that may improve downstream processing operations such as distillation or filtration. In particular embodiments, methods of treating water sources are disclosed that utilize chemical pretreatments that may adjust the pH to improve the solubility of particular species in a given water source, which may in turn decrease scaling and fouling caused by the precipitation of weakly soluble compounds during subsequent water recovery operations. Weakly soluble compounds may include various sulfates, carbonates, and silicates, for example.

Embodiments disclosed herein may also be directed to the treatment of a water source contaminated with microorganisms, such as microbes, viruses, or fungi, in which the addition of a chemical pretreatment may kill existing microorganisms and/or prevent further growth. The use of chemical pretreatments as disclosed herein may also stabilize treated water sources by acting as a buffer solution that prevents the degradation of volatile species, which may then allow for collection and storage of a water source for extended periods of time without the need for additional pH- and/or temperature-controls.

In general, the extraction of potable water from water sources containing mineral and/or microorganism contamination in accordance with the embodiments described herein may involve at least three steps: (1) chemical pretreatment of a water source; (2) water recovery from the treated water source through distillation or membrane filtration; and (3) transport and storage of a resulting concentrated waste product.

In one aspect, the present disclosure addresses the problem of precipitate formation in distillation processes or membrane filtration systems that may occur during water extraction from a treated water source. For brines and other solutions that contain poorly soluble materials, removal of the water solvent decreases the solute capacity of the remaining solution, which may trigger precipitation of solids that can clog and foul distillation equipment or filtration membranes. Further, the addition of chemical pretreatments to a water source may also exacerbate this problem by increasing the concentration of species that initiate the precipitation of a number of slightly soluble minerals and organic materials. The problem of precipitation is particularly important in water purification applications because the buildup of precipitates can lead to decreased overall water recovery and may also require the shutdown of purification processes for repair or replacement of parts before purification can resume.

The inventor providing the instant disclosure has discovered precipitation after the addition of a chemical pretreatment or stabilizer solution may be controlled by providing a mineral acid that has an absence, or negligible concentration, of sulfates or sulfate-producing compounds. Accordingly, a greater recovery rate of potable water may be obtained from a given water source before damage to purification equipment caused by the precipitation of poorly soluble contaminants occurs.

The term "negligible" as used herein means that the concentration of the specified solute is below a threshold that may detrimentally effect the solubility of other solutes that may be present in a given solution or produce a precipitate, which, in one or more embodiments, may be less than 5% by total mass of the solution, less than 2.5% by total mass of the solution, or less than 1% by mass of the total solution.

For example, during the treatment of urine as a water source, there are two sources of sulfate, the first being sulfates naturally present in the urine and the second being those introduced with the pretreatment chemicals. The percent water recovery desired without precipitation may also be a factor in determining how much sulfate may be in the pretreatment solution. In the instance that the target recovery is 85% or greater without sulfate precipitation, it may be necessary to add a pretreatment solution having a reduced concentration of sulfates.

In one or more embodiments of the present disclosure, chemical pretreatments may be used to treat a water source before extraction of a purified water product by adding the chemical treatment to the water source at a percent by volume (vol %) that ranges from a lower limit selected from the group of 0.5 vol %, 0.75 vol %, 1 vol %, 2.5 vol %, 5 vol %, and 7.5 vol %, to an upper limit of 2.5 vol %, 5 vol %, 7.5 vol %, 10 vol %, 15 vol %, and 20 vol %, where the vol % of the chemical pretreatment may range from any lower limit to any upper limit. Depending on the type of water source to be treated, the desired amount for chemical pretreatment may vary. For example, in the extraction of water from urine, a particularly desirable amount of chemical pretreatment to treat urine may be an amount added that is enough to raise the concentration of the chemical pretreatment to a vol % of the total solution within the range of 0.5 vol % to 10 vol % in some embodiments, from 1 vol % to 7 vol % in other embodiments, and from 1.5 vol % to 5 vol % in yet other embodiments. The range may be adjusted depending on the concentration of solids, minerals, or other contaminants in a given water source and the temperature- or pressure-dependent variations of the water source volume.

In some embodiments, chemical pretreatments described herein may be used in conjunction with filtration-based methods to extract potable or grey water from a given water source. For example, water may be extracted from treated water source using reverse osmosis filtration. During filtration methods, after a water source is treated, a water product may be generated by passing a portion of the water stream through a filter membrane. The remaining waste stream containing the concentrated solutes or particulates is carried away from the membrane and either recycled or disposed of. The use of chemical pretreatments that minimize the formation of precipitates in filtration methods are also desirable, because colloidal and particulate contaminants may build up on membrane filter surfaces and cause fouling and damage.

Other water purification techniques may be incorporated into the methods of the present disclosure, such as membrane processes, sub-micron or nano-scale filtration, ion exchange, UV treatment, and ozone treatment methods. Moreover, a combination of filtration and distillation may be applied to purify water sources in some embodiments.

In other embodiments, purified and/or potable water may be generated from a treated water source using any number of distillation methods. Distillation processes utilize volatilization or evaporation and subsequent condensation in order to separate water from a more complex solution. In one or more embodiments, distillation may be performed by heating a treated water source to the boiling point of water at a given pressure, or decreasing pressure until vaporization occurs at a given temperature. However, chemical pretreatments described herein may be adapted with other distillation methods, such as vacuum-based methods, freeze-drying, or electrolysis to produce vapor from water.

In particular applications, chemical pretreatments in accordance with the present disclosure may be used in combination with one or more water purification techniques to extract potable water from urine. More than 140 different substances generally are found in urine. These substances may be broadly categorized as electrolytes, nitrogenous substances, vitamins, metabolites, and hormones. About seventy percent of the total weight of these materials is accounted for by just two components, urea (50%) and sodium chloride (20%). A breakdown which lists the most abundant components of urine is presented in Table 1 below.

TABLE 1

Major Constituents of Human Urine.

| Constituent | Formula | Concentration in urine, mg/L |
|---|---|---|
| Urea | $H_2NCONH_2$ | 23,800 |
| Sodium Chloride | NaCl | 9,450 |
| Sodium | Na | 3,180 |
| Potassium | K | 1,590 |
| Calcium | Ca | 260 |
| Creatinine | $C_4H_7N_3O$ | 954 |
| Phosphorus | P | 875 |
| Sulfur | S | 794 |
| Ammonia | $NH_3$ | 555 |
| Hippuric Acid | $C_6H_5CONHCH_2CO_2H$ | 555 |
| Uric Acid | $C_5H_4N_4O_3$ | 555 |
| Other | — | 5,202 |
| | Totals | 47,600 |

In embodiments where distillation is used to recover potable water, it is possible for all of these materials to appear as contaminants in urine distillate. In practice, however, it has been found that only a few components are troublesome in purification processes. Contamination of the distillate may be substantially avoided by pretreating the urine with a chemical pretreatment in accordance with the present disclosure that contains an effective amount of water-soluble hexavalent chromium. The use of the chemical pretreatments may serve to substantially prevent or minimize, for example: (1) distillation of dissolved gases such as ammonia and unidentified odoriferous substances which, upon distillation, redissolve in the distillate and contaminate the same; and (2) decomposition of salts such as urea and other urine solutes to gases which are liberated during evaporation and redissolve in the distillate as contaminants.

The composition of urine given in Table 1 is merely illustrative; urine specimens will vary from individual to individual. For example, the free ammonia content of randomly sampled urine varies from 0 to about 1,500 milligrams per liter (mg/L). If no preventive action is taken when distilling urine as a water source, ammonia, generally present as the carbonate or bicarbonate salt, may be transported, together with the liberated carbon dioxide and water vapor, from the system evaporator to its condenser.

The purification of urine as a water source also introduces further complications due to the presence of naturally occurring enzymes and microorganisms. For example, urea present in urine decomposes in the presence of the extracellular enzyme urease produced by bacteria that are invariably present in urine samples. Once introduced to a urine supply, bacteria multiply rapidly and will within a short time, e.g., 12 to 48 hours, decompose most of the urea. Characteristically, the urine gradually becomes basic as bacterial urease produces ammonia from urea according to the equation:

$$H_2NCONH_2 + H_2O \rightarrow 2NH_3 + CO_2 \quad (Eq.\ 1)$$

However, the treatment of microbe-contaminated water sources with hexavalent chromium may be effective as a mechanism for killing microbes and/or arresting microbial growth. Hexavalent chromium may easily penetrate cellular membranes and may effect toxicity by damaging membrane integrity, inhibiting enzymes within the electron transport chain, and other enzymatic activities crucial to microbial metabolism. In addition, hexavalent chromium also acts as an oxidizer to destroy nucleic acids and other essential organic molecules present in microbial cells. Thus, hexavalent chromium is bi-functional in its prevention of microbial decomposition of urea to ammonia because, in addition to being highly toxic by virtue of being a heavy metal ion, it is also a potent oxidizer.

In one or more embodiments, methods of chemically treating water sources before distillation or filtration are described in which an acid source containing no sulfates, or substantially no sulfates (including sulfate-forming species), is used in combination with a solution of hexavalent chromium. In particular embodiments of the present disclosure, chemical pretreatments in accordance with embodiments disclosed herein may enable water recovery from urine or other brines without excessive precipitation of poorly soluble minerals including sulfates, alkaline carbonate and bicarbonates such as calcium sulfate, calcium carbonate, magnesium sulfate, magnesium carbonate, and other poorly soluble minerals such as barium sulfate and silicon dioxide. In addition, reduced precipitation may also prevent mineral scaling of surfaces within distillation or filtration systems during water purification operations.

In some applications, chemical pretreatments described herein may be used in combination with a toilet or other sanitation fixture that delivers a volume of the chemical pretreatment, which combines with a urine source when the toilet is flushed. When mixed with the chemical pretreatment, the urine may be disinfected and, further, may be stabilized to prevent or reduce urea hydrolysis and the growth of bacteria and fungi during storage before subsequent distillation or filtration. When added to stabilize urine for storage, the chemical treatments may provide additional pH buffering of pretreated urine at pH levels of around 2 to minimize corrosion of surfaces. Without this pH buffering capacity, pH of pretreated urine can be as low as 1 in brines when dilute urine is distilled.

In a particular embodiment, chemical pretreatments described herein may be used in low pressure water recovery systems such as those aboard the International Space Station (ISS) that use a urine processor assembly (UPA) as the first stage in processing urine into potable water. The UPA is a closed loop system operating in a microgravity environment that receives urine from the Waste and Hygiene Compartment (WHC) of the ISS. The WHC collects urine and adds pretreatment chemicals to stabilize the urine until it can be further processed for water extraction. Currently, the pretreatment is a solution based formulation that is comprised of a mixture of concentrated sulfuric acid and an aqueous solution of chromium trioxide, similar to the solution described in U.S. Pat. No. 3,556,949, which is hereby incorporated in its entirety by reference. The pretreatment dose is delivered by a metering pump at about 3-4 mL of the chemical pretreatment and 50 mL of flush water per toilet flush. After flushing the WHC, the urine is delivered directly to the UPA wastewater storage tank and is often processed within 1-3 days, or may be transferred to a bladder tank and stored for 30-180 days.

The UPA recovers water using sub-ambient pressure and low temperature distillation. Once the water source is treated with the chemical pretreatment or other pretreatment, it is cycled within the UPA until a desired water recovery rate has been achieved. During processing, urine organics, salts, and minerals become more concentrated as the water molecules are removed. A target water recovery rate for the UPA is 85% recovery by volume, which had been predicted, based on ground testing, to be sufficiently below the saturation potential that would cause mineral precipitates to form. Here, recovery by volume is calculated from the ratio of the volume of actual distillate to the total volume of pretreated urine.

However, because prior chemical pretreatments applied to the urine samples were based upon sulfuric acid, excess sulfate ions initiated the precipitation of calcium sulfate as the waste brine became concentrated at higher recovery rates. The precipitates blocked small tubes within a distillation assembly (DA) of the UPA and flooded the DA with brine, ultimately leading to failure of the UPA on the international space station. The gypsum precipitates, which were not observed in extensive ground testing, have been attributed to elevated in-flight levels of urinary calcium and sulfate ions and additional sulfate from the sulfuric acid formulation. As a result, the UPA was adjusted to operate at a lower water recovery rate (70%) to minimize the potential of precipitation in the DA.

Chemical pretreatments in accordance with the present disclosure may allow for water recoveries of up to 88% from flushed urine (e.g., 88% urine and 12% deionized water by mass in some embodiments), even in high stress conditions where the urine has a calcium concentration of less than or equal to 260 milligrams of calcium per liter. In some embodiments, the upper limit of the water recovery without precipitation of solutes may also be dependent on a number of other parameters that include, for example, calcium concentration, sulfate concentration, pH, and, in the case of urine purification from a waste disposal configuration, the volume of raw urine relative to the water volume used in flushing.

Because chemical pretreatments described herein use acids without or substantially free of sulfates, poorly soluble compounds formed from the combination of sulfates and cations such as calcium remain soluble as water is extracted and the waste brine is concentrated, which results in the observed increase in overall water recovery without scaling of hardware surfaces.

As an exemplary embodiment, chemical pretreatments of the present disclosure may be used in applications where a metering pump of a toilet hardware configuration delivers a predetermined injection volume, e.g. a volume of about 2 to about 5 milliliters in a non-limiting embodiment, of a chemical pretreatment solution per flush of the toilet. For example, current protocol on the ISS injects approximately about 3 to 4 milliliters of chemical pretreatment and an additional fifty milliliters of deionized water to a volume of urine per flush of the toilet. The volume of urine per flush is variable, with a historical average on the order of 200±50 milliliters. Thus, a sufficient volume of chemical pretreatment may be added to give a final vol % of the total volume of urine solution within the range of 0.25 vol % to 10 vol % of chemical pretreatment at 20-25° C. in some embodiments, from 0.5 vol % to 7 vol % at 20-25° C. in other embodiments, and from 1.5 vol % to 5 vol % at 20-25° C. in yet other embodiments. The amount of chemical pretreatment may be adjusted depending on temperature- or pressure-dependent variations of volume to maintain the same mass required to reach the target concentration. For example, solutions that are below the targeted temperature range may require the addition of a smaller volume of chemical pretreatment, while solutions above the targeted range may required the addition of a larger volume of chemical pretreatment.

Chemical pretreatments of the present disclosure may be used with lesser or greater amounts of the volume used on the ISS. Urinary calcium concentrations are not monitored on the ISS, but a calcium concentration of 260 mg calcium per liter of urine may be assumed as a "worst case scenario" concentration (above all expected values) to determine the allowable water recovery rate to minimize precipitation potential during distillation of pooled urine from three people.

Chemical pretreatments in accordance with embodiments disclosed herein may contain a combination of an aqueous solution of hexavalent chromium with an acid source. In one or more embodiments, a chemical pretreatment may be prepared by dissolving a hexavalent chromium salt into an aqueous solution and mixing the solution with an acid, or by dissolving hexavalent chromium salt directly into the acid. Suitable sources of hexavalent chromium, Cr (VI), include salts of hexavalent chromium such as chromium trioxide, chromates such as potassium chromate, lithium chromate, sodium chromate, dichromate salts such as sodium dichromate, potassium dichromate, and the like. In other embodiments, hexavalent chromium may be generated in solution using electrolytic techniques known to oxidize chromium from lower oxidation states to hexavalent chromium.

In one or more embodiments, hexavalent chromium may be present in a water source subsequent to treatment at a molar concentration that ranges from a lower limit selected from the group of $1\times10^{-5}$ M, $1\times10^{-4}$ M, $1\times10^{-3}$ M, and $2\times10^{-3}$ M to an upper limit selected from the group of $1\times10^{-3}$ M, 0.015 M, and 0.05 M, where any lower limit may be used in combination with any upper limit. For example, in one or more embodiments, the concentration of hexavalent chromium in a water source subsequent to treatment may be in a range of about 500 mg/L to about 3 g/L.

Acid sources that may be used in accordance with embodiments of the present disclosure include mineral acids such as phosphoric acid, hydrochloric acid, nitric acid, hydrobromic acid, hydrofluoric acid, perchloric acid, and the like. In addition, the acid source may be any acid sufficient to maintain an overall solution pH of approximately pH 2, which contains no, or substantially no, sulfates and when added to a water source as part of chemical pretreatment, the treated water source remains substantially free of precipitates. Moreover, acid sources described herein may also allow greater extraction of a water product from a treated water source, while the concentrated waste product that is generated remains substantially free of precipitates.

As used herein, "substantially free of precipitates" means that the amount of precipitate present in the solution may be less than 5 wt % in some embodiments, less than 2.5 wt % in other embodiments, less than 1 wt % in other embodiments, less than 0.5 wt % in other embodiments, and completely solid-free or precipitate-free in yet other embodiments. Further, in some embodiments, the term precipitates may be used to reference mineral crystals or other solids that are 10 microns in size or greater which are a source of scale/foul the hardware surfaces and small conduits of a distiller or other purification apparatus; this term may be viewed in contrast with colloids and other particulates smaller than 10 microns such as organic particles that may not produce scale or other residues that negatively affect purification hardware.

In one or more embodiments, the chemical pretreatment may contain an acid source at a relative percent by total mass of the pretreatment (mass %) that ranges from 20 mass % to 100 mass %, a chromium trioxide, where present, in an amount that ranges from 1 mass % to 15 mass %, and a balance of water or an aqueous fluid for a given pretreatment. The final mass density of the pretreatment solutions may range from 1.0 g/mL to 1.7 g/mL in one or more embodiments.

For example, in a particular embodiment, a chemical pretreatment may be added to a water source at a volume that is about 3.6 milliliters of pretreatment per liter of water source and contains about 79.4% phosphoric acid, 14.4% $H_2O$, and 6.2% $CrO_3$ by mass, wherein the concentration of the acid in the phosphoric acid is about 85% by weight. In another example, a chemical pretreatment may be added to a water source at a volume that is about 3.3 milliliters of pretreatment per liter of water source and contains about 77.3% phosphoric acid, 15.9% $H_2O$, and 6.8% $CrO_3$ by mass, wherein the concentration of the acid in the phosphoric acid is about 85% by weight. In yet another example, a chemical pretreatment may be added to a water source at a volume that is about 3.0 milliliters of pretreatment per liter of water source and contains about 74.9% of phosphoric acid, 17.6% $H_2O$, and 7.5% $CrO_3$ by mass, wherein the concentration of the acid in the phosphoric acid is about 85% by weight.

In one or more embodiments, a water source treated with chemical pretreatments in accordance with the present disclosure may remain substantially free of solids or precipitates for a time period sufficient to allow for water extraction. Similarly, concentrated waste products generated may remain substantially free of solids or precipitates after water extraction. In both cases, the solutions may remain substantially free of solids for a time period that ranges from a lower limit selected from a group consisting of 1 day, 3 days, 5 days, 1 week, 1 month, and 6 months, to an upper limit selected from the group of 5 days, 1 week, 1 month, 6 months, 9 months, and 12 months, where any lower limit may be used in combination with any upper limit.

The period of time that the treated water source remains stable may also depend on the particular application and the presence or absence of contaminants such as fungus or other microorganisms. Under clean conditions, the pretreatment is effective for 12 months, but with fungal contamination, the observed storage time may be reduced to about 3 months or less before the fungal growth forms mats that are larger than 10 microns. The chemical pretreatment relies on an initial shock of the hexavalent chromium oxidizer and low pH, and over time a substantial percentage of the hexavalent chromium may become inert trivalent chromium such that there is no residual disinfectant remaining to protect against fungal growth or regrowth.

The criticality of the presence of solids or precipitates may be dependent on the given application. For example, the presence of minimal precipitates or absence of precipitates may be desirable in applications that require continuous production of water product with a minimization of intervention and of repair of a distillation or filtration apparatus, such as operation in a closed environment or aboard the ISS. On the other hand, in applications that involve batch processing, or applications where repair and/or cleaning of a purification apparatus are readily performed without immediate danger, the threshold concentration of precipitates may be higher than applications requiring continuous production.

In one or more embodiments, the acid and hexavalent chromium may be added together to form a single chemical pretreatment. However, for some acids such as hydrochloric acid, one may add the acid and hexavalent chromium sequentially before use to prevent adverse interactions between the acid and hexavalent chromium which may prematurely reduce the chromium.

EXAMPLES

Example 1.1

In the following example, chemical pretreatment formulations are prepared from hexavalent chromium and a number of compatible acid sources. Chemical pretreatments were prepared by first making an oxidizer solution containing hexavalent chromium. The same chromium oxidizer solution is used for all of the following pretreatment formulations in this example.

Prior to formulation of chemical pretreatments with an acid source, an aqueous hexavalent chromium (oxidizer) solution was be prepared by dissolving 30 grams of chromium oxide ($CrO_3$) in 70 grams (i.e., 70 mL) of ultrapure deionized (DI) water. When the $CrO_3$ was completely dissolved and the solution reached room temperature, the temperature was recorded and the mass density of the solution was measured in a 10 mL volumetric flask. The aqueous solution of chromium trioxide is 30% $CrO_3$ solution by mass and has 4.29 moles of hexavalent chromium per kilogram of water (4.29 molal). The mass density of this solution was measured to be 1.25±0.02 gm/L at 22° C. For total chromium and hexavalent chromium analysis, 10 mL of the oxidizer solution was collected. The mass density of the 30% $CrO_3$ solution was measured in a 10 mL volumetric flask and verified that it was within the range of 1.25±0.02 g/mL at 22° C.

Chemical pretreatments based on phosphoric acid and hexavalent chromium are provided in Table 2. The procedure for making the pretreatment solution was based on the volumes for a single flush of the waste and hygiene compartment (WHC, i.e., a toilet) of the ISS.

TABLE 2

Relative volumes of oxidizer and acid of Examples 1.2-1.4 in a pretreatment solution for different injection volumes per WHC flush.

| Urine Pretreatment Solution | Injection Volume, mL per Toilet flush | mL of 30% $CrO_3$ Oxidizer solution | mL of 85% $H_3PO_4$ | Gram Mass of 30% $CrO_3$ | Gram Mass of 85% $H_3PO_4$ |
|---|---|---|---|---|---|
| 3.6 mL of Phosphochromic acid using 30% $CrO_3$ solution | 3.6 | 0.94 | 2.66 | 1.18 | 4.52 |
| 3.3 mL of Phosphochromic acid using 30% $CrO_3$ solution | 3.3 | 0.94 | 2.36 | 1.18 | 4.01 |
| 3.0 mL of Phosphochromic acid using 30% $CrO_3$ solution | 3.0 | 0.94 | 2.06 | 1.18 | 3.50 |

As used in the formulations in Table 2, the oxidizer solution is 30% $CrO_3$ and 70% Water by mass (4.29 molal). The concentrated phosphoric acid, also known as orthophosphoric acid, was approximately 85% $H_3PO_4$ by mass (15% water). All volumes recorded in Table 2 were obtained in temperature conditions falling within the range of 20° C. to 25° C.

Example 1.2

A chemical pretreatment formulation containing hexavalent chromium and phosphoric acid was designed in order to prepare 100 mL of solution for use in a WHC toilet at a 3.6 mL injection volume per flush. The chemical pretreatment was prepared by transferring 26.1 mL (32.6 grams) of a 30% $CrO_3$ oxidizer solution (mass density=1.25±0.02 g/mL) to a flask and adding 73.9 mL (125.6 grams) of 85% phosphoric acid (mass density=1.7 g/mL). All volumes were verified by measuring the mass of flask at each step in procedure (empty, with oxidizer, with oxidizer and acid). As designed, the formulation could be scaled-up to produce five liters of the chemical pretreatment to fill the tank on the ISS and would stabilize about 314 liters of raw urine.

Example 1.3

A chemical pretreatment formulation containing hexavalent chromium and phosphoric acid was designed in order to prepare 100 mL of solution for use in a WHC toilet at a 3.3 mL injection volume per flush. The chemical pretreatment was prepared by transferring 28.5 mL (35.6 grams) of the 30% $CO_3$ oxidizer solution to a tared flask and adding 71.5 mL (121.6 grams) of 85% phosphoric acid. All volumes were verified by measuring the mass of the flask at each step in procedure (empty, with oxidizer, with oxidizer and acid). As designed, the formulation could be scaled-up to produce five liters of this solution to fill the pretreatment tank on the ISS and would stabilize about 286 liters of raw urine.

Example 1.4

A chemical pretreatment formulation containing hexavalent chromium and phosphoric acid was designed in order to prepare 100 mL of solution for use in a WHC toilet at a 3.0 mL injection volume per flush. The chemical pretreatment was prepared by transferring 31.3 mL (39.2 grams) of the 30% oxidizer solution to a weighed flask and adding 68.7 mL (116.7 grams) of 85% phosphoric acid. All volumes were verified by measuring mass of flask at each step in procedure (empty, with oxidizer, with oxidizer and acid). Five liters of this solution would be required to fill the pretreatment tank on the ISS and a scaled-up formulation based on the above would stabilize about 262 liters of raw urine.

Temperature during the formulation of the pretreatment solution determines the final volume of the chromium-water solution. Solutions may be susceptible to expansion due to temperature variations, and thus the preparation procedures should be maintained within the specified 20-25° C. temperature range to minimize variation of results. Preparation outside of that temperature range may require adjustment to account for variations in volume experienced by thermal expansion or contraction.

Additionally, water may be provided to minimize viscosity and density of the pretreatment solution as required to make the chemical pretreatments suitable for injection into a urine stream by pump with the toilet. However, for other embodiments, chromium trioxide may be dissolved directly into 85% phosphoric acid up to its solubility limit, without the addition of water.

Example 1.5

In another example, one liter of the chemical pretreatment solution using phosphoric acid ($H_3PO_4$) was prepared by dissolving 24.3 g of $CrO_3$ in 147 mL of deionized water. Next, 853 mL of 85% $H_3PO_4$ was added to the 147 mL of chromium solution to make 1 L of pretreatment solution. The pretreatment solution was 89.4% concentrated $H_3PO_4$ (includes water contained in concentrated $H_3PO_4$), 9.1% water (used to dissolve $CrO_3$), and 1.5% chromium trioxide by mass. Five liters of solution would be required to fill the pretreatment tank on the ISS, and a scaled-up formulation based on the above would stabilize 254 L of raw urine.

Example 1.6

While the exemplary formulations above utilized phosphoric acid, other acid sources such as hydrochloric acid or nitric acid may be used in other embodiments to reduce the required injection volume, depending on the constraints of the distillation system.

An example of a chemical pretreatment formulated with nitric acid was formulated as a total volume of 226 mL and was prepared by transferring 94 mL (117.5 grams) of 30% $CrO_3$ oxidizer solution (mass density=1.25±0.01 g/mL) to a weighed flask and by adding 132 mL (187.4 grams) of 70% nitric acid (mass density=1.42 g/mL). Appropriate volumes were verified by measuring mass of flask at each step in procedure (empty, with oxidizer, with oxidizer and acid). The pretreatment solution was 61.4% concentrated $HNO_3$ (includes water contained in concentrated $HNO_3$), 27.0% water, and 11.6% chromium trioxide by mass. Five liters of this solution would be required to fill the pretreatment tank on the ISS, and a scaled-up formulation based on the above would stabilize about 417 liters of raw urine.

Example 2

In the following example, the solubility of calcium sulfate (gypsum) in simulated urine was studied for samples containing various formulations of chemical pretreatment. Gypsum has a solubility of 2.1 g/L at 20° C. at standard pressure in water and is significantly less soluble than comparative salts like sodium chloride, which has a solubility of 359 g/L. Moreover, the solubility of gypsum is also dependent on other factors including the presence and/or addition of other salts or changes in pH.

In the sequence of tests conducted, on-orbit urine was simulated with a urine ersatz formulation developed by Verostko, which has a theoretical ionic calcium concentration of 260 mg/L, equal to the maximum urinary calcium concentration expected in-flight. This concentration is compared with the calcium concentration in standard urine, which has a mean calcium concentration of about 188 mg/L. More details regarding the ersatz formulation may be found in Verostko et al., "Ersatz wastewater formulations for testing water recovery systems," NASA 2004-01-2448, which is hereby incorporated by reference. The ersatz formulation also contains 22.5 g of urea/L of urine. The concentration of major solutes in urine ersatz and augmented urine are listed in Table 3.

TABLE 3

Theoretical concentrations of major solutes in urine ersatz and augmented urine used in Example 2.

| | $Cl^-$ (mg/L) | Total $PO_4$ (mg/L) | Total $SO_4$ (mg/L) | $Na^+$ (mg/L) | Total Ammonia Nitrogen (mg/L) | $K^+$ (mg/L) | $Ca^{2+}$ (mg/L) | $Mg^{2+}$ (mg/L) | Total Organic Carbon (mg/L) |
|---|---|---|---|---|---|---|---|---|---|
| Urine Ersatz Formulation | 5600 | 2300 | 3000 | 3000 | 260 | 2000 | 260 | 84 | 8500 |
| Augmented Urine | No target | 3100 | 3000 | No target | No target | No target | 260 | No target | 9200 |

Samples of ersatz were treated with various chemical pretreatments. In order to determine the total gypsum capacity of the samples, an excess of gypsum crystals was added until the solutions reached saturation. The solutions were then stirred for 7 days to reach chemical and physical equilibrium. Saturated solutions were filtered using glass fiber filters (0.7 micrometer pore size), and the filtrate was analyzed by ion chromatography for total dissolved calcium and sulfate concentrations.

The solubility of gypsum in brine ersatz containing the various acid pretreatments is shown in FIG. 1, which shows that brines treated with phosphoric acid, hydrochloric acid, and nitric acid exhibit a greater capacity to solubilize gypsum than the comparative baseline formulation containing sulfuric acid. This result may be attributed to the common ion effect in which the formation of ionic precipitates is accelerated by the addition of ions to the solution that are part of the precipitate. Here, the addition of chemical pretreatments containing sulfuric acid as the acid source leads to an increase in the total concentration of sulfates in solution, which then drives the calcium sulfate equilibrium to favor the formation of a calcium sulfate precipitate in accordance with Le Chatelier's principle.

FIG. 1 also shows that the solubility of gypsum increases slightly with decreasing pH for phosphoric acid, hydrochloric acid, and nitric acid, whereas the solubility decreases with decreasing pH for the comparative baseline sulfuric acid formulation. The overall effect of the alternative acids compared to sulfuric acid was a doubling in the solubility of gypsum in the ersatz brine, which corresponds to 84% water recovery.

Example 3

Testing with the ersatz brine in Example 2 confirmed that the alternative acids are effective at increasing the solubility of particular minerals, including calcium sulfates, in ersatz brine solutions compared to an solutions treated with the sulfuric acid by a factor of about two. Example 2 was conducted by equilibrating artificial urine brine solutions with solid-phase gypsum crystals and measuring the amount of calcium that would dissolve. Gypsum was the only source of calcium in the ersatz.

In Examples 3 and 4, testing of chemical pretreatments was shifted from urine ersatz to real urine solutions with augmented calcium concentrations in order to study the mineral solubility during the process of actual distillation. Experiments were conducted to evaluate the effectiveness of the alternative acids at preventing precipitation of minerals during distillation of urine samples. The question asked was whether the alternative acids would permit distillation of augmented urine to 85% recovery without precipitation of minerals.

The effect of three different oxidizer (hexavalent chromium) concentrations were measured: no oxidizer, a reduced oxidizer dose (0.002 M); and the baseline oxidizer dose (0.015 M) in pretreated urine. The main parameter used to monitor the quantity of mineral precipitates was the mass concentration of fixed suspended solids (FSS) obtained by filtering solids from the treated urine both before and after distillation to 15% of the original volume. In addition, the mass concentration of volatile suspended solids (VSS) was used as a measure to quantify the precipitation of uric acid, a poorly soluble organic compound found in urine.

The goal was to determine the type of mineral acid and the oxidizer concentration (0.0 M, 0.002 M, and 0.015 M) that minimized both inorganic and organic precipitates, the total suspended solids (TSS), in concentrated brines obtained after 85% of the water component has been removed. For the alternative acids, a determination of the dose size required to reach pH 2 was also made in order to maintain a proper comparison to the equivalent pH of the comparative baseline sulfuric acid pretreatment formulation. In this case, applied chemical treatments contained 85% phosphoric acid, 70% nitric acid, and 37% hydrochloric acid, respectively, and the comparative baseline formulation contains about 98% sulfuric acid.

In Examples 3 and 4, urine was collected from volunteers at the Johnson Space Center (JSC). Urine was combined into batches, made up of 20% first morning void and 80% normal urine output. Each batch of urine also corresponded with a 5:1 male-to-female donor ratio. The calcium ion concentration was measured in the raw urine prior to adding the augmentation chemicals. Once the calcium concentration was measured, inorganic and organic chemicals were added to reach 260 mg of Ca/L of raw urine to represent a worst case scenario with respect to calcium precipitation.

The augmented urine was pretreated and distilled under pressure and temperature conditions simulating nominal operation of the distillation assembly (DA) on the ISS. The solutions used in initial testing represent the worst-case (most concentrated) in-flight urine solute concentrations. The maximum calcium concentration was assumed to be 260 mg of calcium/L of raw urine, based upon a statistical analysis of in-flight urinary data. After stabilization chemicals and flush water are added, the calcium concentration is reduced to 206 mg of calcium/L of pretreated urine.

The values in Table 4 are an updated formulation of flushed urine based on recycled filter tank assemblies returned from the ISS and the concentrations of stabilization agent and flush water used for all testing in this example. The theoretical concentration of total chromium is 0.8 g-chromium/L of pretreated urine solution (0.015 M) using the baseline pretreatment on the ISS shown in Table 4. DI water was used to represent the Waste and Hygiene Compartment (WHC) flush water.

TABLE 4

Pretreated urine formulation

| Constituent | Volume |
|---|---|
| Raw urine | 1 L |
| DI (flush) water | 0.265 L |
| Pretreatment solution | 15.9 mL |
| Total pretreated urine solution | 1.281 L |

For the distillation assays, augmented urine was pretreated nominally with flush water and an acid. Specifically, each sample contained 3 mL of the chemical pretreatment, 200 mL raw urine, and 50 mL of water Prior to distillation, the pretreated urine samples were stored at least 1 day at ambient temperature (20° C. (68° F.) to 25° C. (77° F.)) to allow the solution to approach an equilibrium state for the slow oxidation-reduction processes.

A rotary evaporator (Rotavapor® R-215 (BUCHI Labortechnik AG, Switzerland)) was used to distill the pretreated urine. The initial mass of the pretreated urine to be distilled was measured in the glass evaporation flask on a 3-kg scale. The mass was recorded to the nearest 0.1 g. The initial mass of pretreated urine ranged from 300 to 500 g. The evaporation flask was connected to the stop cock and vapor duct of the rotary evaporator.

The pretreated urine was distilled under vacuum to simulate nominal distillation assembly (DA) conditions. The absolute pressure within the evaporation flask was maintained at 60 to 80 mbar and the associated vapor temperature was measured as 39° C. (102° F.) to 41° C. (105° F.). The evaporation vessel rotated at 45 revolutions per minute half-submerged in a heating bath, which was filled with tap water. The heating bath temperature was controlled at 60° C. (140° F.)±5° C. nominal. The chiller liquid temperature was set to 10° C. (50° F.) to 15° C. (59° F.). Distillate condensed on glass surfaces in the condenser and drained by gravity into the distillate collection flask. The percent recovery was calculated by measuring the mass of brine solution at the end of a distillation run and comparing it to the initial mass of pretreated urine.

During distillation, progress was monitored by stopping the process, allowing the pressure and temperature to reach ambient conditions, and determining the mass of the evaporation flask. The mass of remaining brine was determined and the recovery rate was calculated therefrom based upon the change from the initial measured value. Distillation was continued to 85% water recovery, which corresponds to a reduction of the brine fraction to 15% of the original sample volume. After distillation, the brine was stored in the evaporation flask for 1 week at 25° C. (77° F.) to allow solid-liquid phase equilibrium by providing sufficient time for crystal formation if the brine was supersaturated with respect to a mineral.

Following one (1) week of storage, the mass of brine was re-measured and the mass density of the brine was measured with a hydrometer or in a volumetric flask on a scale. A measured mass of brine was passed through a 0.7-micrometer glass fiber filter to measure Total Suspended Solids (TSS), Fixed Suspended Solids (FSS), and Volatile Suspended Solids (VSS) and to isolate any crystals. The evaporation flask and the solids on the filter were rinsed thoroughly to collect any crystals that adhered to the flask's glass surfaces. All of the brine from the evaporation flask was passed through the filter paper. If the quantity of suspended solids was significant, more than one filter paper was used.

The soluble concentration of calcium and the mass quantity of precipitates in distilled brines were the key parameters monitored to determine the reliability and effectiveness of the alternate acid formulations. The main precipitate of interest for the given pretreatment chemicals was calcium sulfate; other precipitates of interest were phosphates and uric acid.

Figure 2:
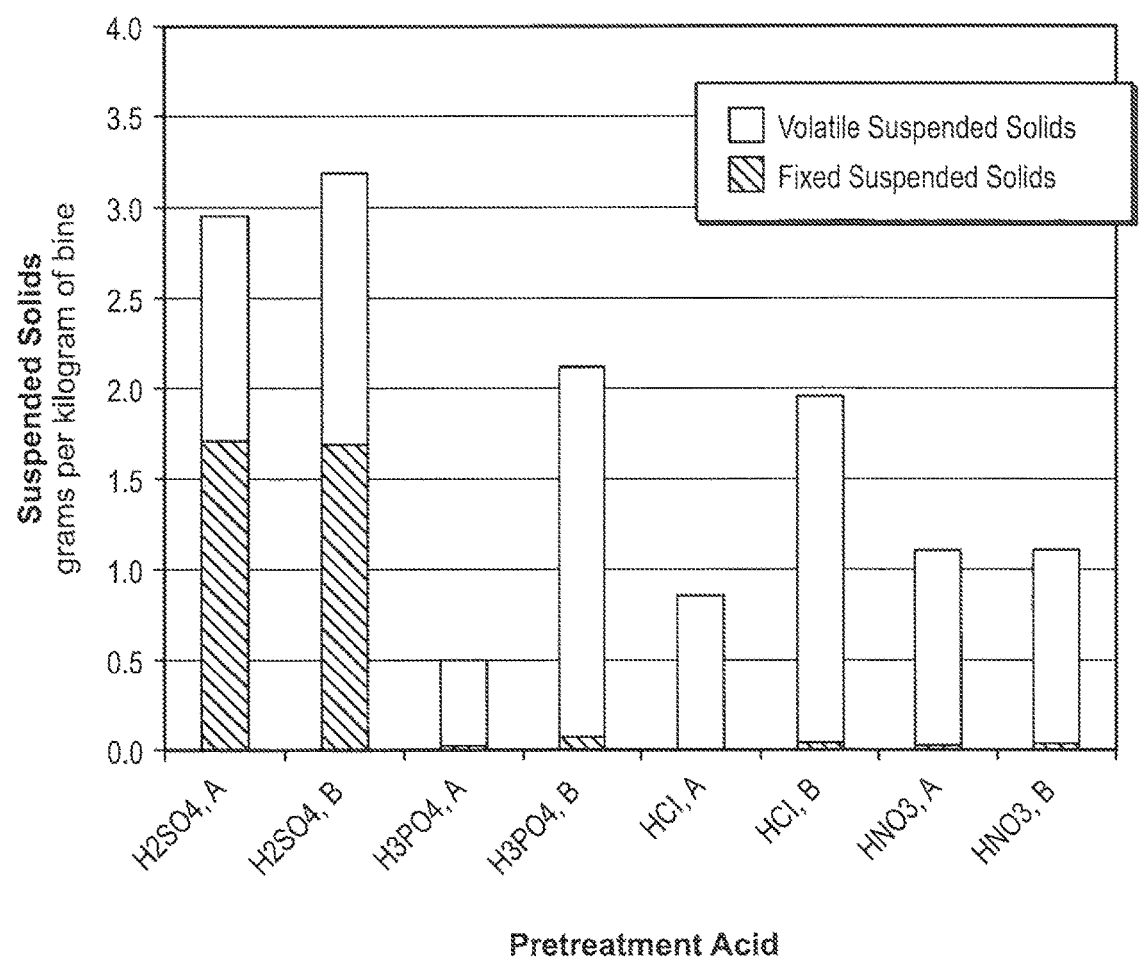
FIG. 2 is an illustration of the decreased content of total suspended solids for brines containing chemical pretreatments in accordance with embodiments of the present disclosure.

The masses of precipitates were monitored by measuring TSS and FSS retained on a glass fiber filter with an average pore size of 0.7 micrometers (0.6 to 0.8 micrometers nominal). The pretreated urine and brine were analyzed for TSS, FSS, and VSS. Measuring FSS and VSS enabled quantification of organic and inorganic suspended solids. The results are illustrated in FIG. 2, which shows the mass concentration of FSS and VSS in treated augmented urine that was acidified but not oxidized by the addition of hexavalent. Samples denoted "A" and "B" represent duplicate TSS measurements obtained from urine solutions after the addition of chemical pretreatment.

For samples without the hexavalent chromium oxidizer, the largest contribution to the TSS is uric acid, which precipitates at 1 to 2 g/kg of brine for all acids, including the comparative baseline formulation containing $H_2SO_4$. In this study, uric acid crystals were identified based on their amber color and morphology. The formation of uric acid crystals in acidified urine brines is a slow process compared to the formation of gypsum crystals. The induction time is on the order of 1 week for uric acid crystals to form from supersaturated urine solutions. Uric acid is poorly soluble and will precipitate in pretreated urine even without concentration by distillation.

Example 4

Figure 3:
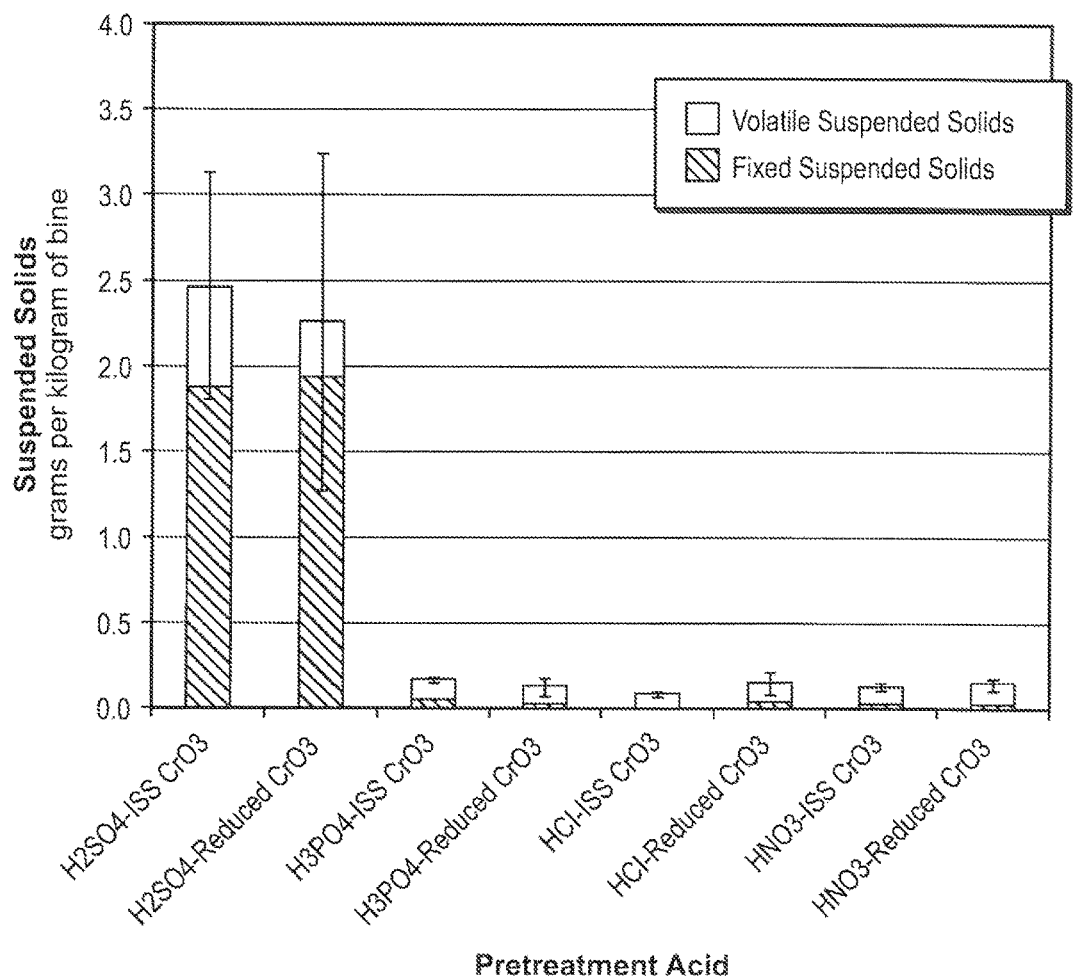
FIG. 3 is an illustration of the decreased content of total suspended solids after partial water recovery by distillation for brines containing chemical pretreatments in accordance with embodiments of the present disclosure.

In the following Example 4, samples were formulated as described above for Example 3, with the exception that the acid sources were supplemented with hexavalent chromium at a "reduced" dose of 0.002 M or a "full" dose of 0.015 M in the pretreated urine. With particular respect to FIG. 3, chemical treatment formulations are assayed wherein the samples denoted "ISS" contain a hexavalent chromium at the full dosage of 0.015 M, and samples denoted "reduced" contain 0.002 M hexavalent chromium.

Samples containing phosphoric acid, hydrochloric acid, and nitric acid exhibit significantly reduced mineral precipitation after 85% water recovery when compared to samples treated with sulfuric acid and oxidizer. The error bars represent±one standard deviation for triplicate distillations of augmented urine samples. FSS values are less than 30 mg/kg of brine for all three alternative acids compared to an average FSS of 1.9 g/kg for the baseline $H_2SO_4$. The VSS values are less than 125 mg/kg of brine for all three alternative acids and 320 mg/kg (reduced oxidizer dose) to 580 mg/kg (full oxidizer dose) for the sample treated with sulfuric acid and hexavalent chromium.

The concentration of dissolved calcium ions was measured for all the filtered brines after being stored for 1 week. All of the alternative acid brines—phosphoric acid, nitric acid, and hydrochloric acid—when at 85% recovery had dissolved concentrations of about 1,400 mg-calcium/L compared to 700 mg-calcium/L for the baseline sample containing the $H_2SO_4$ pretreatment.

The new formulations would use the same hardware that is currently used on the ISS. The current pretreatment formulation would be launched and transported in a 5-L tank that links to the pretreatment/water dispenser pump of the Russian toilet in the WHC. The new formulations prepared with phosphoric or nitric acid would use the same 5-L tank. In the case of hydrochloric acid formulation, two separate tanks would be required because concentrated hydrochloric acid is not compatible with the oxidizer. The relative compositions of the formulations are listed in Table 5. Dosing requirements to achieve equivalent pH values as the baseline pretreatment solution using sulfuric acid are given in Tables 6-9.

TABLE 5

Relative mass content of the pretreatment solution in 5-L tank prior to pretreatment of urine.

| | Mass Density of Pretreatment Solution at 20° C. | Concentrated Acid Solution | Water to Dissolve CrO3 | CrO$_3$ |
|---|---|---|---|---|
| Baseline pretreatment solution with 98% $H_2SO_4$ | 1.35 g/mL | 36.5% | 54.5% | 9.0% |
| Alternative pretreatment solution with 85% $H_3PO_4$ | 1.62 g/mL | 89.4% | 9.1% | 1.5% |
| Alternative pretreatment solution with 70% $HNO_3$ | 1.35 g/mL | 75.4% | 21.1% | 3.5% |
| Alternative pretreatment solutions with 37% HCl | 1.20 g/mL<br>1.17 g/mL | 100%<br>0% | 0%<br>85.8% | 0%<br>14.2% |

With particular reference to Table 5, one liter of the new pretreatment solution using $H_3PO_4$ is prepared by dissolving 24.3 g of $CrO_3$ in 147 mL of DI water. Next, 853 mL of 85% $H_3PO_4$ are added to the 147 mL of chromium solution to make 1 L of pretreatment. The pretreatment solution is 89.4% concentrated $H_3PO_4$ (includes water contained in concentrated $H_3PO_4$), 9.1% water (used to dissolve $CrO_3$), and 1.5% chromium trioxide by mass. Five liters of this solution would be required to fill the pretreatment tank on ISS. Five liters of solution would be sufficient to stabilize about 254 L of raw urine.

One liter of the new pretreatment solution using $HNO_3$ is prepared by dissolving 47 g of $CrO_3$ in 284 mL of DI water.

Next, 716 mL of 70% $HNO_3$ are added to the 284 mL of chromium solution to make 1 L of pretreatment solution. The pretreatment solution is 73.4% concentrated $HNO_3$ (includes water contained in concentrated $HNO_3$), 21.2% water, and 3.5% chromium trioxide by mass. Five liters of this solution would be required to fill the pretreatment tank on ISS and would stabilize about 490 liters of raw urine.

Due to oxidation of chloride ions by hexavalent chromium, hydrochloric acid is less compatible with the oxidizer solution at the tested concentrations. To minimize possible stability problems, it may be beneficial to add the oxidizer and hydrochloric acid to the water source separately or soon after mixing before degradation becomes an issue. While vapor pressure and corrosiveness of 37% hydrochloric acid may be problematic for space flight applications, it may still be beneficial for land-based water purification applications where mixing hydrochloric acid with the oxidizer separately is more convenient, lower volumes of chemical pretreatment are preferred, or where hydrochloric acid is the byproduct of a simultaneous purification process, for example.

TABLE 6

Volume and mass of pretreatment solutions to be injected in each dose with flush water.

| Nominal Doses per Liter of Raw Urine Based on 9 Returned RFTAs | Acid | mL-Pretreatment Solution per Dose (1 injection) | mL-Flush Water per Dose (1 injection) |
|---|---|---|---|
| 5.3 | 98% H2SO4 | 3.0 | 50 |
| 5.3 | 85% H3PO4 | 3.7 | 50 |
| 5.3 | 70% HNO3 | 1.9 | 50 |
| 5.3 | 37% HCl | 2.5 | 50 |

TABLE 7

Concentrations of pretreatment chemicals relative to raw urine for nominal dosing.

| Acid | g-Pure Acid per kg of Raw Urine | g-Cr per kg Raw Urine |
|---|---|---|
| 98% H2SO4 (current baseline operations on ISS) | 7.7 g-H2SO4/kg | 1.0 g-Cr/kg |
| 85% H3PO4 | 24.2 g-H3PO4/kg | 0.25 g-Cr/kg |
| 70% HNO3 | 7.2 g-HNO3/kg | 0.25 g-Cr/kg |
| 37% HCl | 5.9 g-HCl/kg | 0.25 g-Cr/kg |

TABLE 8

Concentrations of pretreatment chemicals in flushed, pretreated urine for nominal dosing.

| Acid | g-Pretreatinent Solution per kg of Raw Urine | mL-Pretreatment Solution per kg of Raw Urine |
|---|---|---|
| 98% H2SO4 (current baseline operations on ISS) | 21.5 g/kg | 15.9 mL/kg |

TABLE 8-continued

Concentrations of pretreatment chemicals in flushed, pretreated urine for nominal dosing.

| Acid | g-Pretreatinent Solution per kg of Raw Urine | mL-Pretreatment Solution per kg of Raw Urine |
|---|---|---|
| 85% H3PO4 | 31.8 g/kg | 19.6 mL/kg |
| 70% HNO3 | 13.6 g/kg | 10.1 mL/kg |
| 37% HCl | 15.9 g/kg | 13.3 mL/kg |

The values listed in Tables 7 and 8 are based on obtaining a pH of 2 in the pretreated augmented urine. If the requirement can be increased to a pH greater than 2 in the future by additional testing, the mass of pretreatment solutions could be reduced. This change would require brine precipitation testing and a long-term bacteria and mold challenge test at a pretreated urine pH of about 2.2 to 2.3 before implementation.

TABLE 9

Concentrations of chemical pretreatments in flushed pretreated urine (PTU) for nominal dosing.

| Acid | g-Pure Acid per kg of PTU | g-Cr per kg of PTU |
|---|---|---|
| 98% H2SO4 (current baseline operations on ISS) | 6.0 g-H2SO4/kg-PTU | 0.78 g-Cr/kg-PTU |
| 85% H3PO4 | 18.6 g-H3PO4/kg-PTU | 0.19 g-Cr/kg-PTU |
| 70% HNO3 | 5.6 g-HNO3/kg-PTU | 0.19 g-Cr/kg-PTU |
| 37% HCl | 4.6 g-HCl/kg-PTU | 0.19 g-Cr/kg-PTU |

Three different strong acids were analyzed as a replacement for $H_2SO_4$ in the assayed urine pretreatment formulations. These alternative acids eliminated the supplementary sulfate ions coming from sulfuric acid which reduce the solubility of calcium in brines. The concentrated acids studied were 85% $H_3PO_4$, 37% HCl, and 70% $HNO_3$. The effect of lowering the oxidizer concentration also was studied to save consumable mass and improve distillate water quality.

Compared to previous in-flight methods in which water recovery was limited to approximately ~70% before mineral precipitation created scaling and fouling problems, chemical pretreatments in accordance with the instant disclosure allow for increased water recovery rates (from brine sources) of about 85% or more.

Embodiments described herein are directed to chemical pretreatments that may be applied to a number of water purification processes, particularly where the water source to be treated contains brine and/or microorganisms. While examples shown are directed to distillation processes, the principles of enhancing recovery while minimizing the formation of precipitates may also be applied to water recovery processes that utilize filtration, e.g., membrane filtration methods such as reverse or forward osmosis, a combination of distillation and filtration, etc.

While the disclosure includes a limited number of embodiments, those skilled in the art, having benefit of this disclosure, will appreciate that other embodiments may be devised which do not depart from the scope of the present disclosure and appended claims. Moreover, embodiments described herein may be practiced in the absence of any element that is not specifically disclosed herein.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. §112, paragraph 6, or 35 U.S.C. §112(f), as applicable, for any limitations of any of the claims herein, except for those in which the claim expressly uses the words 'means for' together with an associated function.

What is claimed is:

1. A method of extracting potable water, comprising:
   treating a water source with a chemical pretreatment comprising a hexavalent chromium and an acid to generate a treated water source, wherein the concentration of sulfate compounds in the acid is negligible, and wherein treated water source remains substantially free of precipitates after the addition of the chemical pretreatment.

2. The method of claim 1, wherein the hexavalent chromium is provided as an aqueous solution of chromium trioxide.

3. The method of claim 1, wherein the acid is one or more selected from a group consisting of phosphoric acid, nitric acid, and hydrochloric acid.

4. The method of claim 1, wherein the acid is phosphoric acid.

5. The method of claim 1, wherein the water source is brine.

6. The method of claim 1, wherein the water source is urine.

7. The method of claim 6, wherein one liter of the urine is pretreated with about 3.6 milliliters of an aqueous solution comprising about 79.4% phosphoric acid, about 14.4% $H_2O$, and about 6.2% $CrO_3$ by mass, wherein the concentration of the acid in the phosphoric acid is about 85% by weight.

8. The method of claim 6, wherein one liter of the urine is pretreated with about 3.3 milliliters per liter of an aqueous solution comprising about 77.3% phosphoric acid, about 15.9% $H_2O$, and about 6.8% $CrO_3$ by mass, wherein the concentration of the acid in the phosphoric acid is about 85% by weight.

9. The method of claim 6, wherein one liter of the urine is pretreated with about 3.0 milliliters per liter of an aqueous solution comprising about 74.9% phosphoric acid, about 17.6% $H_2O$, and about 7.5% $CrO_3$ by mass, wherein the concentration of the acid in the phosphoric acid is about 85% by weight.

10. The method of claim 6, wherein the amount of hexavalent chromium utilized is sufficient to prevent precipitation of uric acid in the urine.

11. The method of claim 1, wherein the amount of hexavalent chromium in the chemical pretreatment is calculated to produce a final concentration of about 0.75 grams by mass of chromium per liter of the water source.

12. The method of claim 1, wherein the amount of hexavalent chromium is sufficient to inhibit bacterial growth in the water source.

13. The method of claim 1, wherein treating a water source with a chemical pretreatment places the pH of the water source into the range of pH 0.5 to pH 2.5.

14. The method of claim 1, further comprising the step of distilling at least a portion of the treated water source to extract potable water.

15. The method of claim 14, wherein the treated water source is distilled to about 12 percent of the volume before distilling and wherein the treated water source remains substantially free of precipitates during the step of distilling.

16. The method of claim 1, further comprising filtering at least a portion of the treated water source to extract potable water.

17. The method of claim 16, wherein the treated water source is filtered by a membrane process to about 12 percent of the volume before filtering and wherein the treated water source remains substantially free of precipitates.

18. A method of reducing the pH in urine to be distilled for potable water extraction, comprising:
   pretreating the urine before distillation with a pretreatment solution comprising one or more acid sources selected from a group consisting of phosphoric acid, hydrochloric acid, and nitric acid, and further comprising hexavalent chromium,
   wherein the urine remains substantially precipitate free after the addition of the pretreatment solution.

19. A method for reducing precipitation in urine to be processed for water extraction, comprising:
   mixing the urine with a pretreatment solution comprising hexavalent chromium compound and phosphoric acid,
   wherein the urine remains substantially precipitate free after the addition of the pretreatment solution and during processing for water extraction.

* * * * *